United States Patent
Mittnacht et al.

[15] 3,691,260
[45] Sept. 12, 1972

[54] IMPACT RESISTANT THERMOPLASTIC COMPOSITION

[72] Inventors: Hans Mittnacht, 2 Rheinparkstrasse, 6800 Mannheim; Edmund Priebe, 22 Brunckstrasse, 6710 Frankenthal, both of Germany

[22] Filed: Feb. 25, 1970

[21] Appl. No.: 14,247

[30] Foreign Application Priority Data

March 8, 1969 Germany..........P 19 11 882.2

[52] U.S. Cl..........260/876 R, 260/29.6 RB, 260/881
[51] Int. Cl.......C08f 41/12, C08f 45/24, C08f 19/18
[58] Field of Search..............................260/876, 881

[56] References Cited

UNITED STATES PATENTS 3,517,084  6/1970  Tellier et al. ...............260/881
3,468,833  9/1969  Meincke....................260/881

FOREIGN PATENTS OR APPLICATIONS 1,124,911  8/1968  Great Britain.............260/876
1,900,346  9/1969  Germany...................260/881

Primary Examiner—Murray Tillman
Assistant Examiner—Helen W. Roberts
Attorney—Johnston, Root, O'Keeffe, Keil, Thompson & Shurtleff

[57] ABSTRACT

Impact-resistant thermoplastic molding composition comprising a mixture of a styrene-acrylonitrile copolymer and a styrene-acrylonitrile graft copolymer on polyacrylate backbone polymer latices. Backbone polymer latices are used which have an average particle diameter between 0.15 and 0.8 $\mu$ and a narrow particle size distribution. The molding compositions can be used to make heavy duty utility articles which are resistant to the action of air and light.

3 Claims, No Drawings

IMPACT RESISTANT THERMOPLASTIC COMPOSITION

This invention relates to impact-resistant thermoplastic molding compositions comprising a mixture of a styrene-acrylonitrile copolymer and a graft copolymer of styrene-acrylonitrile on polyacrylates.

The manufacture of impact-resistant thermoplastic compositions by mixing a rigid component A — comprising a copolymer of styrene and acrylonitrile — with an elastomeric component B — comprising a graft copolymer of a mixture of styrene and acrylonitrile on polyacrylic ester — is known from British Pat. Specification No. 1,124,911.

The polyacrylic ester used as backbone polymer is obtained by the emulsion copolymerization of acrylic esters of alcohols of four to eight carbon atoms with the acrylic ester of tricyclodecenyl alcohol. Latex particles are produced which have a diameter of $0.1\mu$ or less. The following graft copolymerization is preferably carried out in emulsion, a mixture of styrene and acrylonitrile being grafted to the backbone polymer latex of the polyacrylic ester.

The resulting molding compositions are characterized by greater rigidity and better strength than possessed by similar molding compositions in which polyacrylic ester is the backbone polymer but which contain no tricyclodecenyl alcohol in the alcohol component. They also show improved ageing properties over impact resistant molding compositions comprising polydienes as backbone polymer in the soft component.

It is an object of the invention to provide impact resistant thermoplastic molding compositions showing the valuable properties of the above-described molding compositions and possessing, in addition, improved cold impact strength and greater hardness.

This object is achieved by thermoplastic molding compositions prepared from

A. 50 to 85 parts by weight of a copolymer of styrene and acrylonitrile (ratio 50:50 to 90:10) and
B. 15 to 50 parts by weight of a graft copolymer of 10 to 50% by weight of a mixture of styrene and acrylonitrile (ratio 60:40 to 90:10) and 50 to 90 percent by weight of backbone polymer comprising 98 to 80 percent by weight of an acrylic ester of an alcohol of 4 to 8 carbon atoms and 2 to 20 percent by weight of an acrylic ester of tricyclodecenyl alcohol provided that the backbone polymer used in making the component B is in the form of a latex having an average particle diameter of between 0.15 to $0.8\mu$ and shows a narrow particle size distribution.

The particle size values are determined with the aid of an electron microscope. By "mean particle size" we mean the arithmetic mean of the particle diameters.

By "narrow particle size distribution" we mean that 80 percent of the particles have diameters varying from each other by not more than $0.25\mu$, the remaining particles being outside this range, 10 percent above and 10 percent below.

Thus in an integral distribution curve of the particles size the values for $d_{10}$ and $d_{90}$ should not be more than $0.25\mu$ apart.

In manufacturing the backbone polymer latex having an average particle size between 0.15 and $0.8\mu$ use is made, for example, of a seed latex having a particle size of preferably less than $0.12\mu$ and obtained in the usual manner by emulsion copolymerization of the acrylic esters. Further polymerization is effected by adding further monomer and emulsifying agent. The conditions are set in the usual manner (see for example J. Appl. Polym. Sci., 9, 2,929–2,938 (1965) such that only the seed particles of polymer in the latex continue to grow without any new latex particles being formed.

The particle size of the backbone polymer latex may be adjusted as desired by varying the relative properties of seed latex and monomer. In the present invention backbone polymer latices are used in which the particle size is between 0.15 and $0.8\mu$, preferably between 0.2 and $0.6\mu$.

Apart from using a seed latex, there are alternative known polymerization methods of obtaining coarse dispersions, such as emulsion feed or agglomeration of particles.

The backbone polymer latex should comprise a copolymer of different acrylic esters, 98 to 80 percent being an acrylic ester of an alcohol of four to eight carbon atoms, preferably the butyl ester or ethylhexyl ester, whilst 2 to 20 percent by weight are the acrylic ester of tricyclodecenyl alcohol of Formula I:

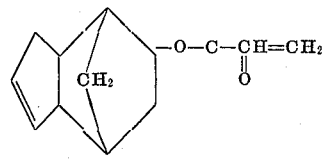

A mixture of styrene and acrylonitrile is then grafted on to this backbone polymer latex, the amount of the mixture used being 10 to 50 percent by weight of the weight of the finished graft polymer. The mixture must contain styrene and acrylonitrile in the proportions 60:40 to 90:10.

The copolymerization of the acrylic esters and the subsequent grafting of the styrene/acrylonitrile mixture are preferably carried out in aqueous emulsion. The usual polymerization aids, such as catalysts, chain regulators and emulsifying agents, as also the usual polymerization conditions, temperature ranges and the like are used.

The elastomeric component B is mixed with the rigid component A. The component A comprises a copolymer of styrene and acrylonitrile. The copolymer of styrene and acrylonitrile, obtained from styrene and acrylonitrile in the ratio 50:50 to 90:10, is obtained according to conventional methods. Such conventional methods include, in particular, bulk polymerization in the absence of substantial amounts of diluent or emulsion polymerization. The copolymer of styrene and acrylonitrile may also be obtained in known manner by polymerization in methanolic suspension. The component B is mixed with the component A preferably by adding the grafted and dried emulsion polymer to the styreneacrylonitrile polymer and mixing in the molten state. This may be carried out, for example, in an extruder or other kneader-type mixer.

If both component A and component B are the form of aqueous emulsions, mixing may be effected by combining the emulsions and coprecipitating the solids contained therein. Another alternative is to mix the component B in the form of an emulsion with component A in the form of a solution and to effect coprecipitation, if necessary after adding a precipitating agent.

The molding compositions of the invention are characterized by improved cold impact strength, greater hardness, reduced shrink-age and slight improvement in flow compared with molding compositions obtained using a backbone polymer latex of small particle size.

The invention is further illustrated by the following Examples in which parts are by weight.

EXAMPLE 1 a. Preparation of further illustrated 98 parts of butyl acrylate and 2 parts of tricyclodecenyl acrylate are polymerized in 154 parts of water, to which 2 parts of 70% sodium dioctylsulfosuccinate as emulsifying agent and 0.5 part of potassium persulfate have been added, by stirring for 3 hours at 65° C. There is thus produced an approximately 40 percent dispersion. The mean particle size in the latex is about $0.1\mu$.

b. Preparation of backbone polymer latex

To a mixture of 2.5 parts the seed latex prepared as in (a) above, 400 parts of water and 0.5 part of potassium persulfate there is added, at 65° C., a mixture of 49 parts butyl acrylate, 1 part of tricyclodecenyl acrylate and 0.38 part of the emulsifying agent during one hour. During the next hour there is added a mixture of 49 parts of butyl acrylate, 1 part of tricyclodecenyl acrylate and 0.76 part of emulsifying agent. After adding 1 part of potassium persulfate in 40 parts of water there is then added dropwise, during the next 2 hours, a mixture comprising 196 parts of butyl acrylate, 4 parts of tricyclodecenyl acrylate and 1.52 parts of emulsifying agent. The polymer mixture is then further polymerized for 2 hours at 65° C. There is thus produced a dispersion with approximately 40 percent solids, the mean particle size being about $0.5\mu$.

If a total of only 100 parts of monomer instead of 300 parts is added, the resulting latex has particles whose mean diameter is about $0.3\mu$.

c. 465 parts of styrene and 200 parts of acrylonitrile are polymerized by stirring at 60° C. in the presence of 2,500 parts of a backbone polymer latex of the above composition and having an average particle size of $0.1\mu$ or $0.3\mu$ or $0.5\mu$, 2 parts of potassium persulfate, 1.33 parts of lauryl peroxide and 1,005 parts of water. There is thus produced a 40 percent dispersion, from which the solid material is precipitated by adding 0.5 percent calcium chloride solution and then washed with water and dried. 1,490 parts of dried polymer (B) are mixed with 2,090 parts of a copolymer (A) comprising 68 parts of styrene to 32 parts of acrylonitrile in a screw extruder at 220° C.

The Table shows the properties of the polymer as a function of the particle size of the backbone polymer latex used. The impact strength and ball indentation hardness were measured on samples obtained by injection molding. Shrinkage was measured on sample obtained by compression molding.

TABLE 1

| Av. part. size of backbone polymer latex | Impact strength (tested according to DIN 53,453), cm. kg./cm.² | | | | | Flexural stress (DIN 53,452) (kg./cm.²) | Ball indent. hardness 10″/60″ (DIN 53,456) (kg./cm.²) | Shrinkage (percent) | Melt index (DIN 53,735) at 200° C./21.6 kg. (g./10′) |
|---|---|---|---|---|---|---|---|---|---|
| | 20° C. | 0° C. | −20° C. | −40° C. | −60° C. | | | | |
| d=0.1μ comp. test | + | + | 54 | 30 | 8 | 710 | 770/720 | 31 | 7.1 |
| d=0.3μ | + | + | + | 79 | 21 | 732 | 940/870 | 18 | 8.1 |
| d=0.5μ | + | + | + | 85 | 24 | 726 | 955/890 | 15 | 9.2 |

+ The sample did not break.

EXAMPLE 2

1,490 g. of polymer B are mixed with 3,510 g. of polymer A. The properties of the products are as follows:

TABLE 2

| Av. part. size of backbone polymer latex | Impact strength (tested according to DIN 53,453), cm. kg./cm.² | | | | | Flexural stress (DIN 53,452) (kg./cm.²) | Ball indent. hardness 10″/60″ (DIN 53,456) (kg./cm.²) | Shrinkage (percent) | Melt index (DIN 53,735) at 200° C./21.6 kg. (g./10′) |
|---|---|---|---|---|---|---|---|---|---|
| | 20° C. | 0° C. | −20° C. | −40° C. | −60° C. | | | | |
| d=0.1μ | + | 80 | 50 | 20 | 6 | 820 | 1,070/1,000 | 24 | 9.6 |
| d=0.3μ | + | + | 66 | 35 | 12 | 830 | 1,120/1,050 | 19 | 10.2 |
| d=0.5μ | + | + | 74 | 42 | 15 | 831 | 1,200/1,090 | 17 | 11.1 |

+ The sample did not break.

We claim:

1. A thermoplastic molding composition comprising:
    A. 50 to 85 parts by weight of a copolymer of styrene and acrylonitrile of a ratio 50:50 to 90:10 and
    B. 15 to 50 parts by weight of a graft copolymer comprising 10 to mean 50 percent by weight of a mixture of styrene and acrylonitrile of a ratio 60:40 to 90:10 and 50 to 90 percent by weight of a backbone polymer comprising taking to 80 percent by weight of an acrylic ester of an alcohol of four to eight carbon atoms and 2 to 20 percent by weight of an acrylic ester of tricyclodecenyl alcohol, wherein the backbone polymer used in the preparation of component B is in the form of a latex having a mean particle size of 0.15 to $0.8\mu$ and showing a narrow particle size distribution both said backbone polymer and said graft copolymer being prepared by emulsion polymerization and said backbone polymer being derived by taking a seed latex of said acrylic esters having a particle size of less than $0.12\mu$ and increasing the size of the particles to said mean particle size by grafting on additional monomers of said acrylic esters.

2. A molding composition as claimed in claim 1 wherein the said backbone polymer is used in the form of a latex having a mean particle size of 0.2 to $0.6\mu$.

3. A molding composition as claimed in claim 1 wherein the backbone polymer is used in the form of a latex in which 80 percent of the particles have diameters varying from each other by not more than $0.25\mu$, whilst the diameters of the remaining particles are outside this range, 10 percent above and 10 percent below.

* * * * *

UNITED STATES PATENT OFFICE
CERTIFICATE OF CORRECTION

Patent No. 3,691,260        Dated September 12, 1972

Inventor(s) Mittnacht et al

It is certified that error appears in the above-identified patent and that said Letters Patent are hereby corrected as shown below:

cover page, left hand column insert
-- [73] ASSIGNEE: Badische-Anilin-&Soda-Fabrik Aktiengesellschaft, Ludwigshafen am Rhein, Germany --

Column 3, line 11 " of further illustrated " should read -- of seed latex --

Column 4, line 39 " 10 to mean 50 percent " should read -- 10 to 50 percent --

Column 4, line 42 " taking " should read -- 98 --

Signed and sealed this 17th day of April 1973.

(SEAL)
Attest:

EDWARD M. FLETCHER, JR.
Attesting Officer

ROBERT GOTTSCHALK
Commissioner of Patents